(12) United States Patent
Kanazawa et al.

(10) Patent No.: US 10,348,218 B2
(45) Date of Patent: Jul. 9, 2019

(54) POWER CONVERSION DEVICE AND ELECTRIC POWER STEERING DEVICE USING THE SAME

(71) Applicant: Hitachi Automotive Systems, Ltd., Hitachinaka-shi, Ibaraki (JP)

(72) Inventors: Takuro Kanazawa, Tokyo (JP); Kimihisa Furukawa, Tokyo (JP); Shigehisa Aoyagi, Tokyo (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 15/526,359

(22) PCT Filed: Sep. 16, 2015

(86) PCT No.: PCT/JP2015/076258
§ 371 (c)(1),
(2) Date: May 12, 2017

(87) PCT Pub. No.: WO2016/098410
PCT Pub. Date: Jun. 23, 2016

(65) Prior Publication Data
US 2017/0331395 A1    Nov. 16, 2017

(30) Foreign Application Priority Data

Dec. 15, 2014  (JP) ................. 2014-252589

(51) Int. Cl.
*H02M 7/5387* (2007.01)
*H02P 27/08* (2006.01)
(Continued)

(52) U.S. Cl.
CPC ........ *H02M 7/53873* (2013.01); *B62D 5/046* (2013.01); *H02M 5/458* (2013.01);
(Continued)

(58) Field of Classification Search
CPC ............... H02M 7/493; H02M 7/5387; H02M 7/53875; H02M 2007/53876
See application file for complete search history.

(56) References Cited

U.S. PATENT DOCUMENTS 5,955,862 A   9/1999 Nguyen Phuoc
9,520,817 B2 * 12/2016 Suzuki ................. B62D 5/0463
(Continued)

FOREIGN PATENT DOCUMENTS

JP    11-4594 A     1/1999
JP    2001-327173 A   11/2001
(Continued)

OTHER PUBLICATIONS

JP 2011010534 A, machine translation is being provided.*
(Continued)

*Primary Examiner* — Fred E Finch, III
*Assistant Examiner* — Rafael O. De León Domenech
(74) *Attorney, Agent, or Firm* — Crowell & Moring LLP

(57) ABSTRACT

An object of the invention is to simultaneously solve a miniaturization and an improvement of productivity of a power conversion device, a temperature rise suppression of a smoothing capacitor, and a reduction of motor noises. The power conversion device of the invention includes a smoothing capacitor, a first power conversion unit and a second power conversion unit which are connected in parallel, and a control unit which generates a PWM pulse on the basis of an output voltage vector and a PWM carrier. The control unit includes a correction unit which corrects a predetermined output voltage vector value to two or more different output voltage vector values such that an average value in one period of the PWM carrier becomes the predetermined output voltage vector value. The correction unit corrects a first output voltage vector value in a first period, and corrects (Continued)

a second output voltage vector value in a second period different from the first period.

10 Claims, 11 Drawing Sheets

(51) Int. Cl.
  *H02M 7/5395* (2006.01)
  *H02M 5/458* (2006.01)
  *B62D 5/04* (2006.01)
  *H02M 7/493* (2007.01)
  *H02M 1/00* (2006.01)
(52) U.S. Cl.
  CPC ......... *H02M 7/493* (2013.01); *H02M 7/5387* (2013.01); *H02M 7/5395* (2013.01); *H02M 7/53875* (2013.01); *H02P 27/08* (2013.01); *H02M 2001/0003* (2013.01); *H02M 2007/53876* (2013.01)

(56) References Cited

U.S. PATENT DOCUMENTS

| 2011/0285225 A1 | 11/2011 | Matsuda et al. |
| 2013/0194852 A1 | 8/2013 | Nakano et al. |

FOREIGN PATENT DOCUMENTS

| JP | 2005-269769 A | | 9/2005 |
| JP | 2011010534 A | * | 1/2011 |
| JP | 2011-250489 A | | 12/2011 |
| JP | 2012-178927 A | | 9/2012 |
| JP | 2013-162536 A | | 8/2013 |

OTHER PUBLICATIONS

International Search Report (PCT/ISA/210) issued in PCT Application No. PCT/JP2015/076258 dated Dec. 8, 2015 with English-language translation (four (4) pages).
Japanese-language Written Opinion (PCT/ISA/237) issued in PCT Application No. PCT/JP2015/076258 dated Dec. 8, 2015 (three (3) pages).

* cited by examiner

| | PERIOD OF HARMONIC WAVE SUPERPOSITION SYSTEM | |
|---|---|---|
| | Rm > Rmin | Rm < Rmin |
| CASE 1 | PWM CARRIER PERIOD (Ti0) | INTERMITTENT PERIOD: Ti1 (Ti1 > Ti0) |
| CASE 2 | INTERMITTENT PERIOD: Ti1 (Ti1 > Ti0) | INTERMITTENT PERIOD: Ti2 (Ti2 > Ti1) |

POWER CONVERSION DEVICE AND ELECTRIC POWER STEERING DEVICE USING THE SAME

TECHNICAL FIELD

The present invention relates to a power conversion device, and particularly to a power conversion device which is used in an electric power steering device.

BACKGROUND ART

In recent years, there is proposed an electric power steering device of an electromechanical integrated structure in which motor windings of total three or more phases are provided in one motor housing, total two power conversion units are provided in a housing of a power conversion device, and these housing are connected to each other. An example of a system of the electromechanical integrated structure is disclosed in PTL 1. In addition, a PWM control is well known as a scheme of controlling the three-phase motor using a DC power source and the power conversion unit. In the PWM control, a current value flowing the motor and a motor rotation speed are detected, and a voltage command value to the power conversion unit is calculated on the basis of a command value given from a host and the detection result, so that torque of the motor and the motor rotation speed can be controlled to a desired value.

Herein, a detection method in which the power conversion unit and a wiring unit electrically connected to the motor are used to detect will be exemplified as a method of detecting the current flowing to each phase of the motor. However, in such a method, there should include three current detectors and detection wirings in each of two power conversion units, and further include operational amplifiers in a control unit to amplify the values obtained from detectors. Therefore, the power conversion device is increased in size, and a connecting process becomes burden.

Another method of detecting the current flowing to each phase of the motor is disclosed in PTL 2 for example. The technique disclosed in PTL 2 is a scheme of obtaining the current value flowing to each phase of the motor using only one current detector by synchronizing the PWM switching period of each phase with a current detection timing of the current detector. In addition, the technique is a scheme in which a correction control is performed to make an average value of voltage vectors Vs' and Vs" to be equalized with a voltage vector Vs so as to secure time for detecting the current and to obtain the current value flowing to the respective phases of the motor when the switching timings of the respective phases of the power conversion units approach each other, and there is secured no sufficient time for the current detector to detect the current. A control technique for realizing the detection by equalizing the average value of the voltage vectors Vs' and Vs" with the voltage vector Vs will be referred to as "harmonic wave superposition system".

CITATION LIST

Patent Literature

PTL 1: JP 2011-250489 A
PTL 2: JP 11-4594 A

SUMMARY OF INVENTION

Technical Problem

An object of the invention is to provide a power conversion device which calculates a voltage command value on the basis of a current value flowing to a motor and controls the motor to perform a desired operation so as to suppress an increase in effective current flowing to a smoothing capacitor while suppressing motor noises when a harmonic wave superposition system is used.

Solution of Problem

A power conversion device according to the present invention converts a DC voltage input from a DC power source into an AC voltage to control a motor, and includes: a smoothing capacitor that smooths the DC voltage; a first power conversion unit that includes a bridge circuit to convert power; a second power conversion unit that includes a bridge circuit to convert power and is connected to the first power conversion unit in parallel; and a control unit that generates a PWM pulse on the basis of an output voltage vector and a PWM carrier, wherein the control unit generates a first PWM pulse to control an output of the first power conversion unit on the basis of a first output voltage vector, and generates a second PWM pulse to control an output of the second power conversion unit on the basis of a second output voltage vector, wherein the control unit includes a correction unit that corrects a predetermined output voltage vector value to be two or more different output voltage vector values such that an average value in one period of the PWM carrier becomes the predetermined output voltage vector value, and wherein the correction unit performs the correction of the first output voltage vector value in a first period that is one of a plurality of periods of the PWM carrier, and performs the correction of the second output voltage vector value in a second period that is one of the plurality of periods of the PWM carrier and different from the first period.

Advantageous Effects of Invention

According to the invention, there is provided a power conversion device configured by two power conversion units which include one current detector in a DC bus bar, so that an increase in effective current of a smoothing capacitor between a power source and the current detector can be suppressed while suppressing motor noises by intermittently setting a period for the harmonic wave superposition of the respective power conversion units. Other effects obtained by the invention will be obvious from the description of embodiments.

DESCRIPTION OF EMBODIMENTS

Figure 13:
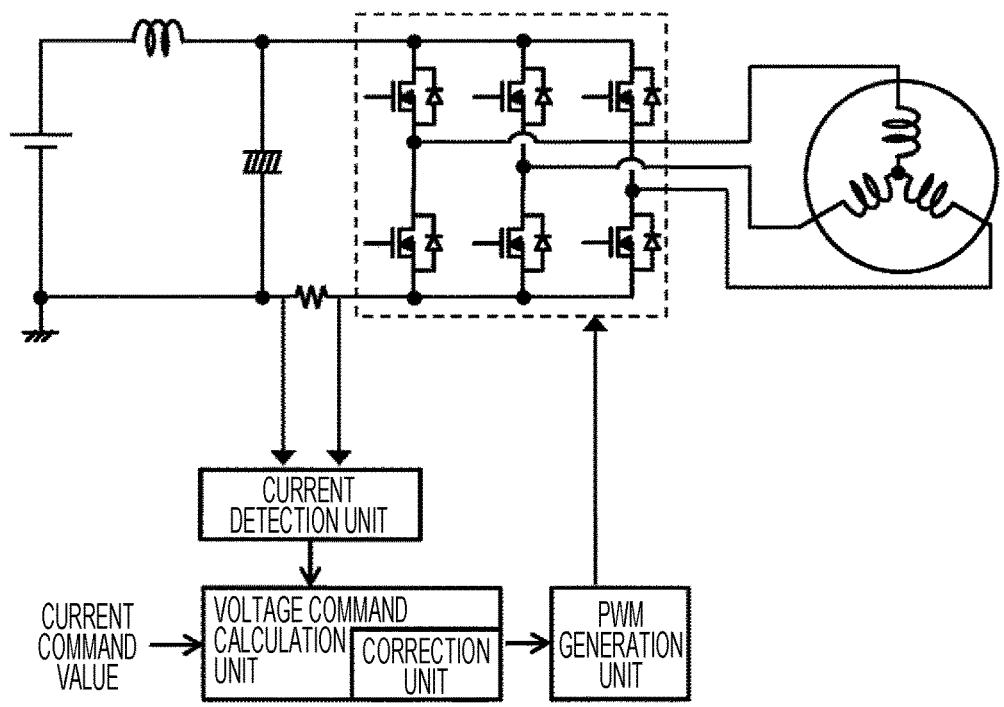
FIG. 13 is a diagram illustrating a circuit configuration of the power conversion device in a conventional example.

Hereinafter, embodiments of a power conversion device according to the invention will be described with reference to the drawings. Further, the same components in the respective drawings will be denoted with the same symbols, and the redundant description will be omitted. In addition, a harmonic wave superposition system of the related art will be described using FIGS. 13 to 15.

Figure 14:
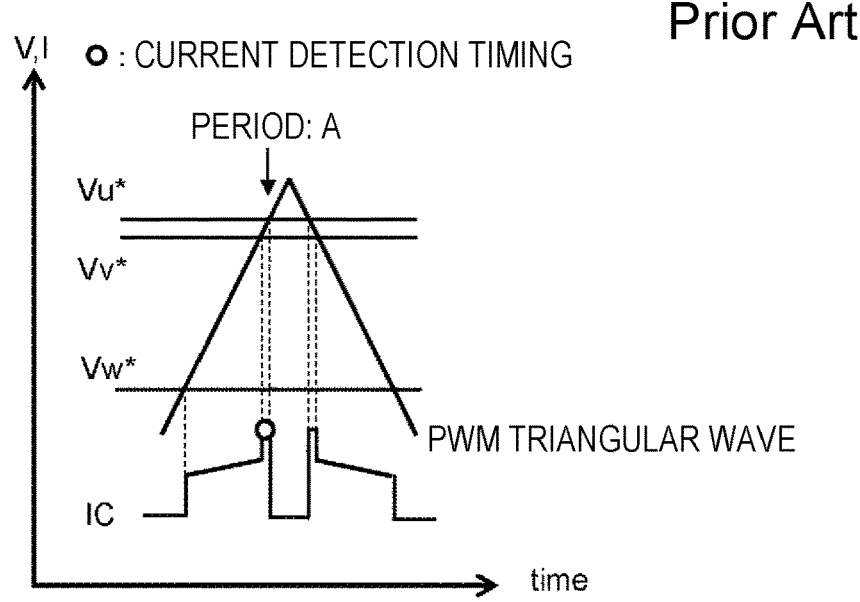
FIG. 14 is a diagram illustrating a current waveform of the smoothing capacitor in a case where the harmonic wave superposition system in the conventional example is applied.

FIG. 14 illustrates a scheme in which the current values of the respective phases of the motor are obtained using one current detector by synchronizing the PWM switching periods of the respective phases with the current detection timing of the current detector. In FIG. 14, there are plotted a PWM triangular wave at an operation timing of the power conversion device, voltage command values $Vu^*$, $Vv^*$, and $Vw^*$ of the respective phases of a three-phase bridge circuit of a power conversion unit, and a current waveform Ic of a smoothing capacitor between the three-phase bridge circuit and a DC power source. Period A of FIG. 14 illustrates a period after the PWM triangular waveform exceeds the voltage command value $Vv^*$ until exceeding the voltage command value $Vw^*$. Period A is a period when a current value flowing in the U phase of the motor is detected by synchronizing the PWM switching period with the current detection timing.

When the PWM triangular wave and the voltage command value are in relation illustrated in FIG. 14 at the operation timing of the power conversion device, the current having a waveform illustrated in the drawing flows in the smoothing capacitor. However, since the U-phase voltage command value $Vu^*$ and the V-phase voltage command value $Vv^*$ approach each other, the width of the period is narrow, and thus the current is hard to detect by the current detector.

Figure 15:
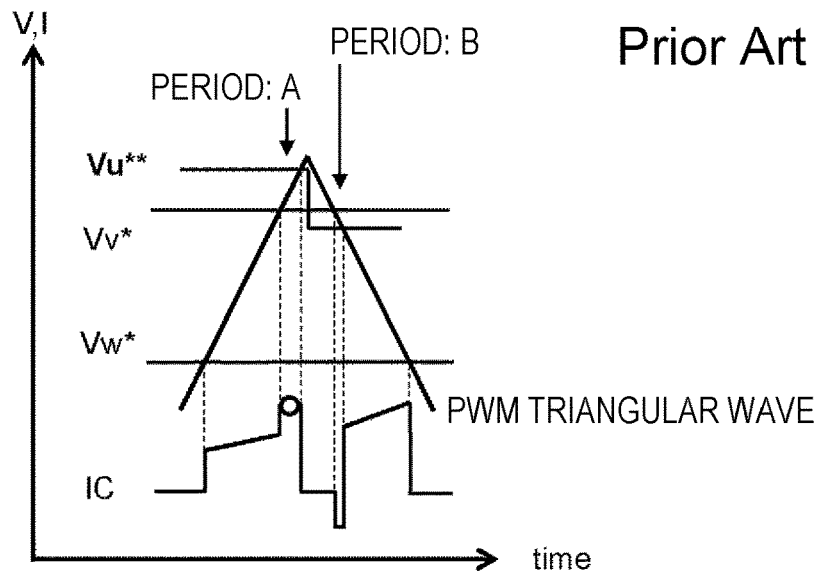
FIG. 15 is a diagram illustrating a current waveform of the smoothing capacitor in a case where the harmonic wave superposition system in the conventional example is applied.

FIG. 15 illustrates a scheme in which a correction control is performed to make an average value of voltage vectors Vs' and Vs" to be equalized with a voltage vector Vs so as to secure time for detecting the current and to obtain the current value flowing to the respective phases of the motor. A control technique for realizing a current detection by equalizing the average value of the voltage vectors Vs' and Vs" with the voltage vector Vs will be referred to as "harmonic wave superposition system". In the harmonic wave superposition system illustrated in FIG. 15, the width of period A is widened by changing a U-phase voltage command value $Vu^{}$ in the first/latter half of the triangular wave to enable the current detector to detect the U-phase current. Further, an average value of $Vu^{}$ is equal to $Vu^*$ of FIG. 14. In addition, many other techniques are proposed for the harmonic wave superposition system besides the technique illustrated FIG. 15, and the same effect may be obtained even by applying the other techniques.

In this way, a time sufficient for detecting the current is not secured since the voltage command values of the respective phases approach. Even in a case where there occurs a period where the motor current is not normally detected, the currents flowing to the respective phases of the motor are detected only by one current detector in a DC bus bar when the harmonic wave superposition system is used.

However, in the harmonic wave superposition system, there is a need to provide a new period (period B) when a reverse current in order to extend an energization time of a period in one carrier period (period A in FIG. 15) and to equalize the average value of the voltage command value. Therefore, as can be seen from a comparison between the waveforms of a smoothing capacitor current Ic illustrated in FIGS. 14 and 15, an effective value of the current flowing to the smoothing capacitor is increased when the harmonic wave superposition system is applied. As a result, there is a problem in that the smoothing capacitor is increasingly heated. As the smoothing capacitor, an electrolytic capacitor having a large capacitance is normally used. However, the electrolytic capacitor is a heat life-span component, and thus the harmonic wave superposition system finally lowers a reliability of the power conversion device.

Figure 16:
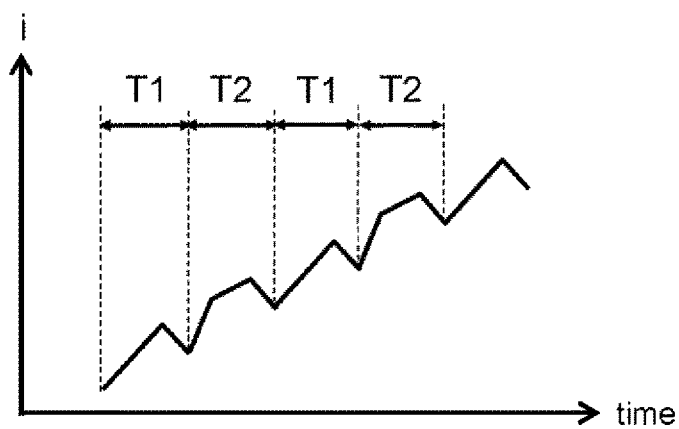
FIG. 16 is a diagram illustrating a motor current waveform in a case where the harmonic wave superposition system in the conventional example is applied.

On the other hand, a scheme is considered to suppress an increase of the effective current value of the smoothing capacitor by taking synchronization only at the current detection timing of the power conversion device without operating the harmonic wave superposition system in every period of the PWM. However, in such a scheme, a ripple waveform synchronized with a current detection period is generated at the end of the motor output wire terminal of the power conversion unit. For example, a motor current waveform illustrated in FIG. 16 shows that a harmonic wave superposition is not performed in period T1, and the harmonic wave superposition is performed in period T2 for the detection. As a result, frequency components equal to or lower than the period of a PWM carrier are contained in the ripple waveform appeared in the motor current. Therefore, there is a problem in that abnormal sounds equal to or lower than the period of the PWM carrier (that is, in an audible range) are generated from the motor which is a noise generator. In particular, an in-vehicle component such as an electric power steering system described above is required for a silent operation.

As described above, it is significantly important to solve minimization of the power conversion device, improvement of productivity, suppression of temperature rise of the smoothing capacitor, and reduction of motor noises.

First Embodiment

Figure 1:
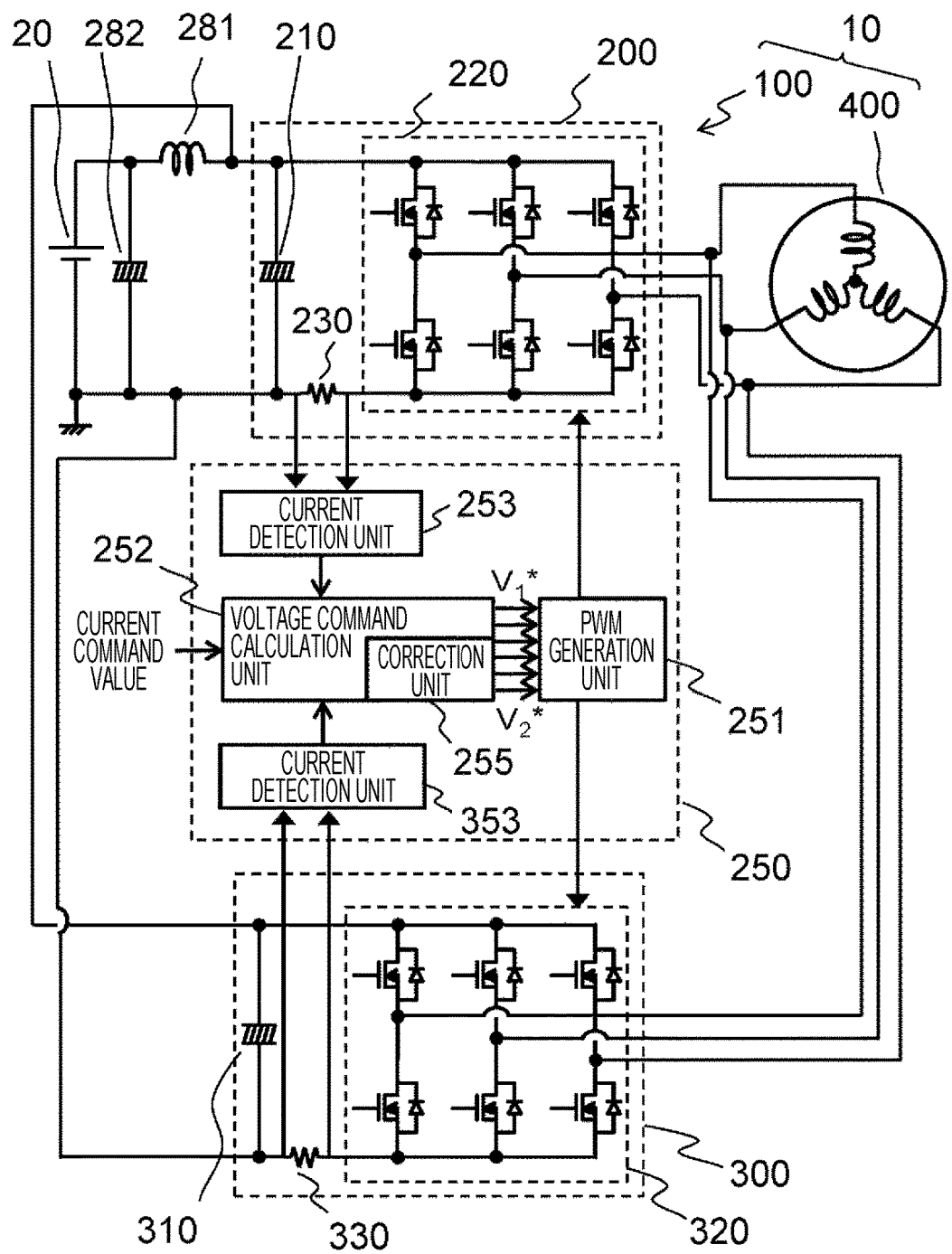
FIG. 1 is a circuit diagram of a power conversion device in a first embodiment.

A power conversion device 100 according to a first embodiment will be described using FIGS. 1 to 4. FIG. 1 is a circuit diagram illustrating the entire configuration of the power conversion device 100 according to the first embodiment.

The power conversion device 100 which converts the power of a DC power source 20 from DC to AC is connected to a motor 400 which converts electric energy into mechanical energy and drives. Herein, a drive apparatus 10 is configured by the power conversion device 100 and the motor 400. The motor 400 is configured by a three-phase motor for example.

The power conversion device 100 includes two power conversion units of a power conversion unit 200 and a power conversion unit 300. In the power conversion unit 200, six semiconductor elements forming a three-phase bridge circuit 220 for converting the DC power to the three-phase AC are provided. As the semiconductor element, there is a power semiconductor element such as a MOSFET (metal-oxide semiconductor field-effect transistor) or an IGBT (Insulated Gate Bipolar Transistor).

One or more smoothing capacitors 210 are provided between positive and negative terminal wires near the DC power source 20 from the three-phase bridge circuit 220 to smooth the voltage. The smoothing capacitor 210 is made using an electrolytic capacitor having a sufficient capacitance or a conductive polymer hybrid electrolytic capacitor.

A current detector 230 is provided between the three-phase bridge circuit 220 and the negative terminal wire of the smoothing capacitor 210 to detect a phase current of the motor. As the current detector 230, a resistor having a small resistance is normally used, and other current detectors such as a current transformer may be used. A normal mode chock coil 281 and a capacitor 282 are disposed as noise suppression components near the DC power source 20 from the smoothing capacitor 210.

Further, while not illustrated, a relay may be provided in every wire to electrically connect the power conversion unit 200 and the power conversion unit 300 to the motor 400 in order to turn on/off the circuit for emergency. As a relay, a semiconductor element such as a MOSFET and a mechanical electromagnetic relay may be used. In addition, a relay may be provided near the DC power source 20 from the normal mode chock coil 281 or near the power conversion unit 200 and the power conversion unit 300. As a relay, there may be used a bidirectional relay or a mechanical electromagnetic relay in which two MOSFETs are connected in series with the same potential at their source electrodes. Further, the configuration of the power conversion unit 300 is the same as that of the power conversion unit 200, and the detailed description will be omitted.

Next, a control unit of the power conversion device will be described. The power conversion device 100 includes a control unit 250. The control unit 250 includes the voltage command calculation unit 252, and receives a current command value from the drive apparatus 10 to control the motor to a desired value. In addition, the control unit 250 includes a current detection unit 253 and a current detection unit 353 which amplify a voltage value obtained from the current detector 230 and a current detector 330, and sends a current detection value to the voltage command calculation unit 252.

The voltage command calculation unit 252 generates voltage commands Vu1*, Vv1*, Vw1*, Vu2*, Vv2*, and Vw2* which are sent to the respective phases of the three-phase bridge circuit 220 and a three-phase bridge circuit 320 on the basis of the current command value and the current detection value. Herein, the voltage command value to the power conversion unit 200 will be collectively referred to as V1*, and the voltage command value to the power conversion unit 300 will be collectively referred to as V2*.

The generated voltage commands V1* and V2* are output to a PWM generation unit 251. The PWM generation unit 251 outputs a gate voltage command to the respective semiconductor elements of the three-phase bridge circuit 220 and the three-phase bridge circuit 320. Further, the PWM generation unit 251 is commonly used in the power conversion units in FIG. 1, and may be provided separately for the power conversion unit 200 and the power conversion unit 300.

The voltage command calculation unit 252 further includes a voltage command correction unit 255. In a case where the switching timings of the respective phases of the power conversion unit approach each other or synchronized with each other and thus there is no sufficient time for the current detector to detect the current as illustrated in FIG. 14, the voltage command correction unit 255 corrects the voltage command to make the average value of the voltage commands of one period of the PWM waveform to be equalized. As a result, a sufficient time can be secured to perform the current detection, and the current detection can be made using the current detector 230 and the current detector 330 provided in the DC bus bar.

The semiconductor elements of the three-phase bridge circuit 220 and the three-phase bridge circuit 320 are turned on or off on the basis of the gate voltage command sent from the control unit 250. The output of the motor 400 is controlled to be a desired value by converting the DC power supplied from the DC power source 20 into a three-phase AC power.

Next, the description will be given about the operations of the power conversion unit 200 and the power conversion unit 300, particularly of the harmonic wave superposition system. Further, in the following description, a current detection period of each power conversion unit is assumed to be completed once per two periods of the PWM carrier.

As an operation condition at a timing of the power conversion device 100, there is assumed a state where the voltage command values of the respective phases do not approach and a sufficient time to detect the current is able to be secured. In this case, the current command value transmitted from the drive apparatus 10 is equally divided into the power conversion unit 200 and the power conversion unit 300 from the voltage command calculation unit 252. The PWM generation unit 251 outputs the gate voltage command to the three-phase bridge circuit 220 and the three-phase bridge circuit 330 on the basis of the voltage command value. As a result, the power conversion unit 200 and the power conversion unit 300 output substantially the same voltage and current to the motor 400.

Next, it is considered that the voltage command values of the respective phases of the power conversion unit approach each other and a sufficient time to detect the current is not able to be secured. As illustrated in FIG. 14, since the voltage command values approach, it is difficult to detect the U-phase current in the power conversion unit 200 and the power conversion unit 300. Therefore, the respective power conversion units detect the U-phase current by applying the harmonic wave superposition system illustrated in FIG. 15.

Figure 2:
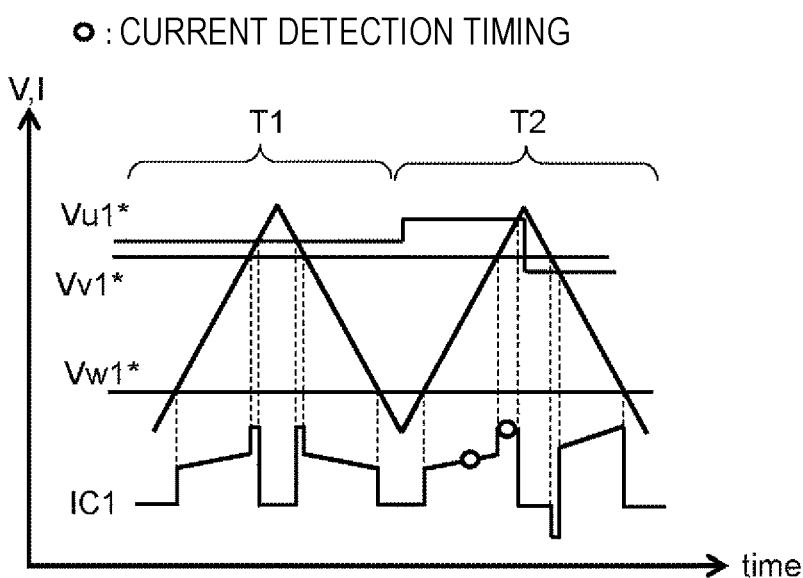
FIG. 2 is a diagram illustrating a current waveform of a smoothing capacitor 210 of a first power conversion unit in the first embodiment.
Figure 3:
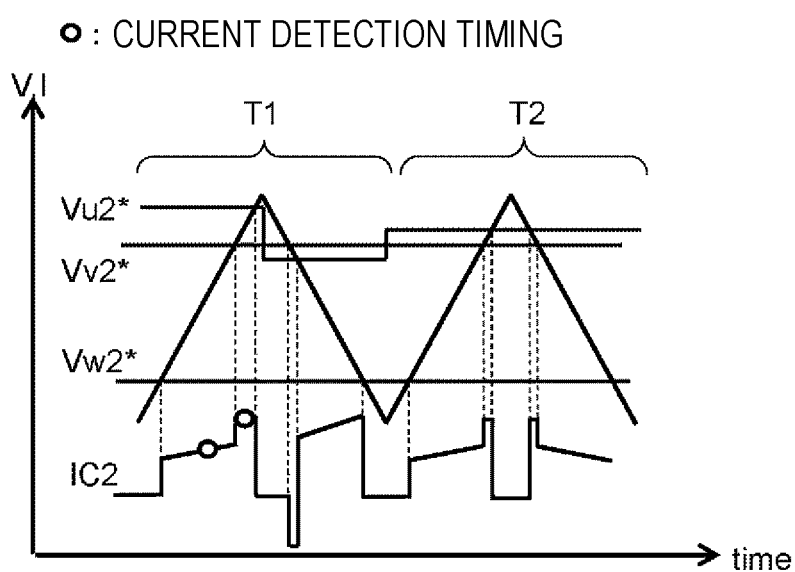
FIG. 3 is a diagram illustrating a current waveform of a smoothing capacitor 310 of a second power conversion unit in the first embodiment.

Herein, the power conversion unit 200 performs, as illustrated in FIG. 2, the current detection in period T2 among periods T1 and T2 which are the current detection period (that is, two periods of the PWM carrier), and also performs the correction of the voltage command value by the harmonic wave superposition only in period T2. On the other hand, the power conversion unit 300 performs, as illustrated in FIG. 3, the current detection and the correction of the voltage command value by the harmonic wave superposition in period T1 in order to shift a timing to perform the harmonic wave superposition system on the basis of the power conversion unit 200. In this way, the number of times of the harmonic wave superposition of the power conversion unit 200 and the power conversion unit 300 is set to once in the current detection period (that is, two periods of the PWM carrier), and the timing is set to be matched in the respective power conversion units.

Figure 4:
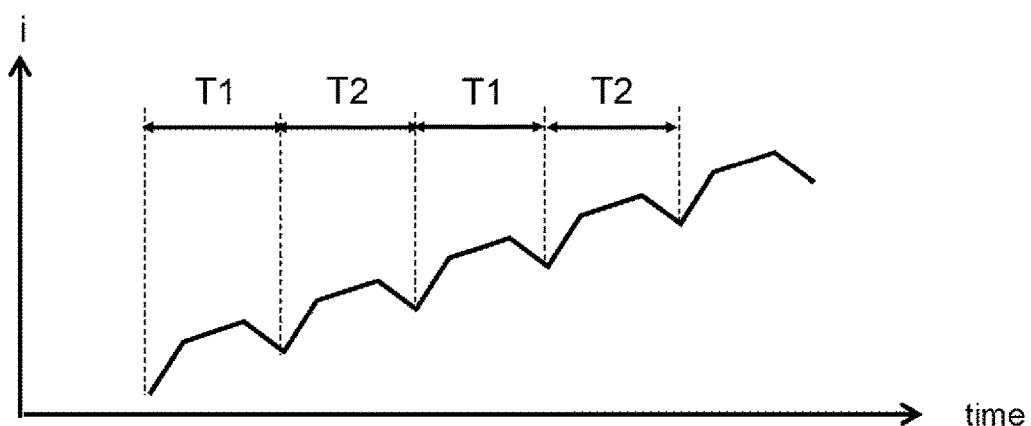
FIG. 4 is a motor current waveform in the first embodiment.

FIG. 4 illustrates several periods of waveforms of the motor wire current by the above-described current detection scheme. The current waveform of the motor wire becomes a value obtained by adding the outputs of the power conversion unit 200 and the power conversion unit 300. The ripple waveform caused by the harmonic wave superposition appears in the power conversion unit 300 in period T1, and the power conversion unit 200 in period T2. However, there is generated no new frequency component equal to or lower than the period of the PWM carrier in the ripple waveform appearing in the motor wire by shifting the current detection timings of the power conversion unit 200 and the power conversion unit 300 by one carrier period. As a result, no new noises in an audible range are generated as illustrated in FIG. 16 even when the harmonic wave superposition system is performed intermittently.

With the configuration described above, an increase of the effective current value of the smoothing capacitor caused by the harmonic wave superposition system can be suppressed, and as a result a temperature rise of the smoothing capacitor can be suppressed. The suppression of the temperature rise of the smoothing capacitor leads not only to an improvement of reliability, but also to a reduction of the capacitance of the smoothing capacitor and further to cut the number of components.

In addition, since the outputs of two power conversion units are added, the ripple waveform appearing in the motor output wire terminal of the power conversion device is equal to the case of the conventional power conversion device in which one power conversion unit is provided. In other words, even when the number of times of the harmonic wave superposition is reduced, the frequency component of the noise generated from the motor (noise source) does not equal to or less than the frequency of the PWM carrier, and the noise in the audible range is suppressed.

Furthermore, since the number of current detectors provided in the power conversion unit is set to one, a miniaturization of the power conversion device and an improvement of productivity are also realized.

Further, this embodiment has been described such that the smoothing capacitor 210 and a smoothing capacitor 310 are individually included in each power conversion unit. However, the smoothing capacitor may be disposed between the power conversion units 200 and 300 and the DC power source 20, and used in common.

In addition, the current detector 230 has been described to be provided near the negative electrode of the DC bus bar. However, the current detector 230 may be separately provided in the wire on the positive electrode side where the power conversion unit 200 and the smoothing capacitor 210 are connected, and in the wire on the positive electrode where the power conversion unit 300 and the smoothing capacitor 310 are connected.

Furthermore, in this embodiment, the current detection period has been assumed to be two times the PWM period. However, the period may be equal to or more than the two times, or may be an intermittent period long in a range not causing a noise problem of the motor of which the voltage command value is corrected by the harmonic wave superposition so as to be matched to the current detection period. At this time, the intermittent periods of the respective power conversion units may be different from each other. For example, the period of the harmonic wave superposition may be matched at a timing a common multiple of the respective intermittent periods.

Second Embodiment

Figure 5:
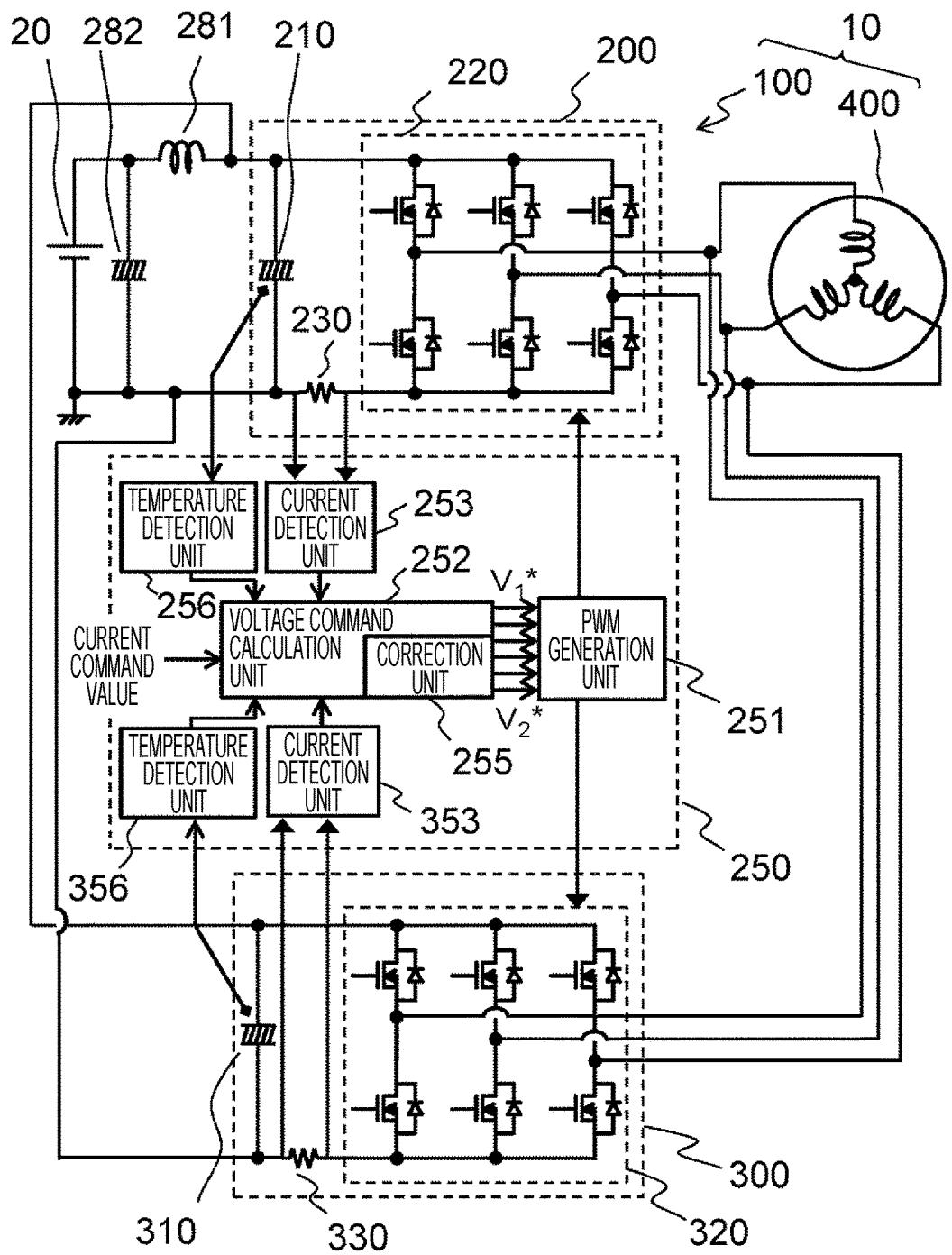
FIG. 5 is a circuit diagram of the power conversion device in a second embodiment.
Figure 6:
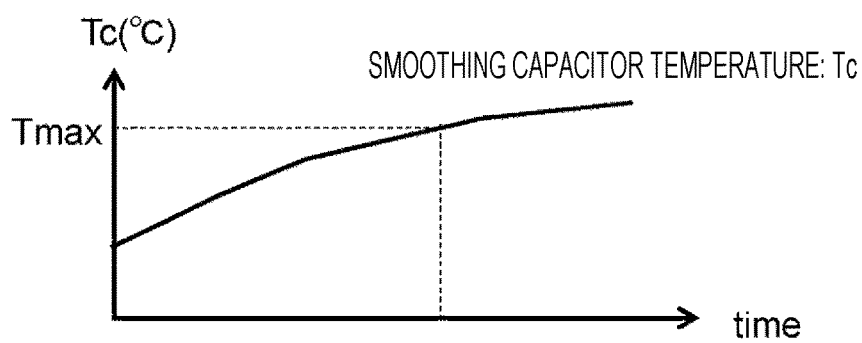
FIG. 6 is a diagram illustrating an application of a harmonic wave superposition system in the second embodiment.

The description will be given about the power conversion device 100 according to a second embodiment using FIGS. 5 and 6. Further, the common configurations to the first embodiment will be omitted.

The control unit 250 in this embodiment includes a temperature detection unit 256 which detects the temperature of the smoothing capacitor 210 and a temperature detection unit 356 which detects the temperature of the smoothing capacitor 310. Herein, examples of a temperature measuring method include a method of directly reading a temperature by connecting a thermocoupler, a method of estimating a temperature from a thermistor mounted in the same substrate, and a method of calculating an inner temperature using a heating amount derived from a magnitude of the energizing current and a thermal time constant expressed by an equivalent thermal circuit.

In addition, the smoothing capacitor 210 and the smoothing capacitor 310 are regulated by a temperature upper limit Tmax. The control unit 250 monitors the temperatures of the respective smoothing capacitors during a period when the power conversion device 100 is operating. In the following, a control scheme in a state where a smoothing capacitor temperature is equal to or less than Tmax will be described by classifying the control into two cases using FIG. 6.

<Case 1>

Case 1 is defined as a case where the harmonic wave superposition system of the power conversion unit 200 and the power conversion unit 300 does not operate intermittently when a smoothing capacitor temperature Tc is smaller than Tmax. In Case 1, when the smoothing capacitor temperature Tc is smaller than Tmax (Tc<Tmax), period Ti0 of the harmonic wave superposition system is equal to the period of the PWM carrier.

Thereafter, when the power conversion device 100 keeps on operating, and the temperature of any one or both of the smoothing capacitor 210 and the smoothing capacitor 310 become equal to or more than Tmax, one or both of the power conversion unit 200 and the power conversion unit 300 apply the intermittent control of the harmonic wave superposition system as described in the first embodiment. Period Ti1 of the applied intermittent control is set to satisfy Ti1>Ti0.

<Case 2>

On the other hand, Case 2 is defined as a case where the harmonic wave superposition system of the power conversion unit 200 and the power conversion unit 300 intermittently operates when the smoothing capacitor temperature Tc is smaller than Tmax. The period of the harmonic wave superposition system at this time is Ti2 larger than the period of the PWM carrier.

Thereafter, when the power conversion device 100 keeps on operating, and the temperature of any one or both of the smoothing capacitor 210 and the smoothing capacitor 310 become equal to or more than Tmax, one or both of the power conversion unit 200 and the power conversion unit 300 apply the control such that the intermittent period of the harmonic wave superposition system is increased compared to the case of Tc<Tmax. In other words, period Ti3 of the intermittent control in the case of Tc>Tmax is set to satisfy Ti3>Ti2.

With the control as described above, the temperature of the smoothing capacitor is monitored, and the smoothing capacitor can be protected by intermittently performing the harmonic wave superposition system in a case where the smoothing capacitor temperature is equal to or more than an allowable value.

In addition, in a period when the smoothing capacitor temperature is equal to or less than the allowable value, the current detection period can be set to be equal to or approach the period of the PWM carrier. Therefore, the scheme of the invention can be applied even to a system which has a need to control the motor control with a high accuracy by shortening the current detection period.

Third Embodiment

The power conversion device 100 according to a third embodiment will be described using FIGS. 7 to 9. Further, the common configurations to the first or second embodiment will be omitted.

Figure 7:
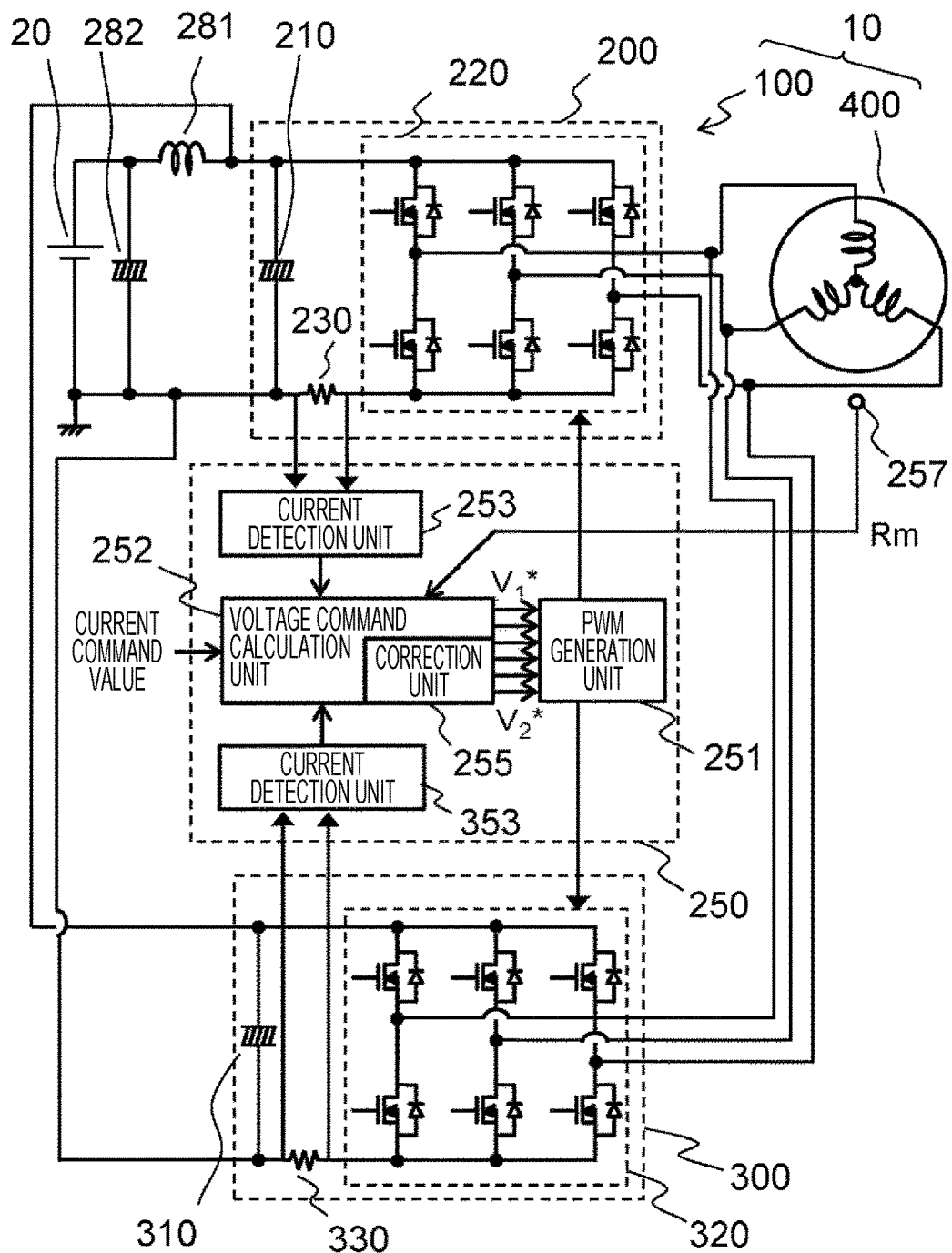
FIG. 7 is a circuit diagram of the power conversion device in a third embodiment.

FIG. 7 is a circuit diagram illustrating the entire configuration of the power conversion device 100 according to this embodiment. The power conversion device 100 according to this embodiment further includes a position detection device 257 which detects a rotation speed of the motor 400 compared to the power conversion device according to the first embodiment. As the position detection device 257, a resolver or a GMR (Giant Magneto Resistance) sensor may be used.

A motor rotation speed Rm detected by the position detection device 257 is input to the control unit 250. A lower limit value Rmin of the motor rotation speed is set in the control unit 250. The control unit 250 compares the motor rotation speed Rm detected by the position detection device 257 with the lower limit value Rmin of the motor rotation speed.

Figure 8:
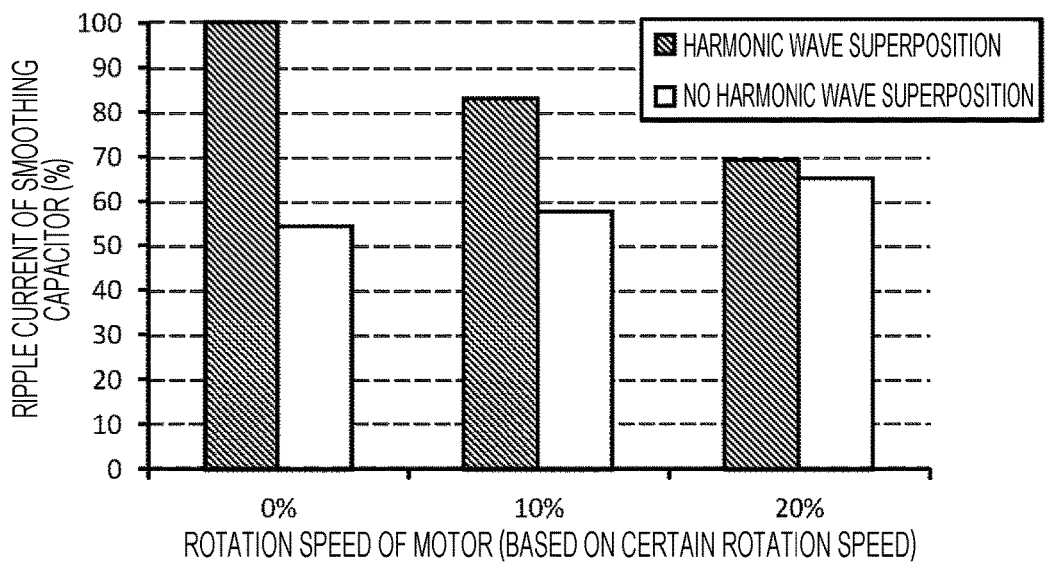
FIG. 8 is a diagram illustrating analysis results of an effective value of a ripple current of the smoothing capacitor using a motor rotation speed as a parameter.
Figure 9:
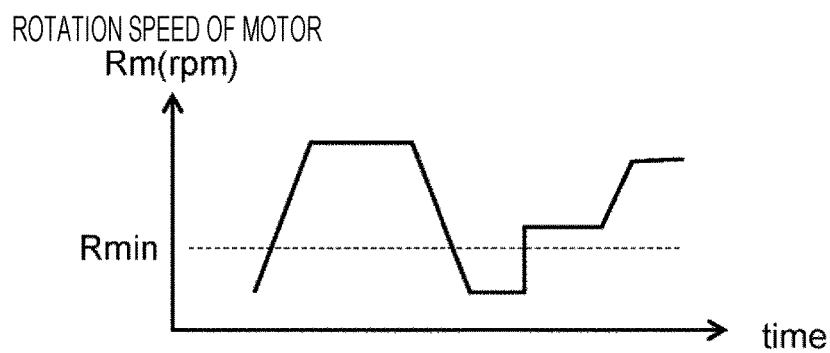
FIG. 9 is a diagram illustrating an application of the harmonic wave superposition system in the third embodiment.

FIG. 8 illustrates analysis results of the effective value of the ripple current of the smoothing capacitor in a case where the harmonic wave superposition system is not applied, and in a case where the harmonic wave superposition system is applied. In FIG. 8, the case where the harmonic wave superposition system is not applied means a case where the current value of the motor is directly detected from a plurality of motor wires when the motor current is constant. In addition, the case where the harmonic wave superposition system is applied means a case where the current value of the motor is obtained using the current detector provided in the DC bus bar when the motor current is constant, and a case where the harmonic wave superposition system is applied in every period of the PWM carrier using the motor rotation speed Rm as a parameter.

As can be clearly seen from FIG. 8, in a case where the harmonic wave superposition system is applied in every period of the PWM carrier, and the motor rotation speed is reduced, the effective value of the ripple current of the smoothing capacitor is increased under the influence of the harmonic wave superposition system. This is because the voltage command values of the respective phases approach in a system where the harmonic wave superposition system is applied when the motor rotation speed is reduced, and a period where the current detection is difficult is increased.

In the power conversion device 100 according to this embodiment, the control unit 250 switches the control by comparing the motor rotation speed Rm with the predetermined lower limit value Rmin. In FIG. 9, two cases are described as a control method in a case where the motor rotation speed Rm is larger than Rmin.

<Case 1>

Case 1 is defined as a case where the harmonic wave superposition system of the power conversion unit 200 and the power conversion unit 300 does not intermittently operate when the motor rotation speed Rm is larger than Rmin. In Case 1, period Ti0 of the harmonic wave superposition system is equal to the period of the PWM carrier when the motor rotation speed Rm is larger than Rmin (Rm>Rmin).

Thereafter, when the power conversion device 100 keeps on operating, and the motor rotation speed Rm is smaller than Rmin, one or both of the power conversion unit 200 and the power conversion unit 300 apply the intermittent control of the harmonic wave superposition system as described in the first embodiment. Period Ti1 of the applied intermittent control is set to satisfy Ti1>Ti0.

<Case 2>

On the other hand, Case 2 is defined as a case where the harmonic wave superposition system of the power conversion unit 200 and the power conversion unit 300 intermittently operates when the motor rotation speed Rm is larger than Rmin. The period of the harmonic wave superposition system at this time is Ti2 larger than the period of the PWM carrier.

Thereafter, when the power conversion device 100 keeps on operating, and the motor rotation speed Rm is smaller than Rmin, one or both of the power conversion unit 200 and the power conversion unit 300 apply the control such that the intermittent period of the harmonic wave superposition system is increased compared to the case of Rm>Rmin. In other words, period Ti3 of the intermittent control in the case of Rm<Rmin is set to satisfy Ti3>Ti2.

In addition, the control scheme according to this embodiment described above may be applied simultaneously with the control according to the second embodiment. For example, under the condition of Case 1, even in a case where the motor rotation speed Rm becomes equal to or lower than Rmin, the harmonic wave superposition system in the period of the PWM carrier may start to apply in a case where the smoothing capacitor temperature Tc is equal to or less than the upper limit Tmax. In addition, under the condition of Case 2, even in a case where the motor rotation speed Rm becomes equal to or less than Rmin, the control of increasing the period for applying the harmonic wave superposition system may be not performed in a case where the smoothing capacitor temperature Tc is equal to or less than the upper limit Tmax.

With the control as described above, the rising of the smoothing capacitor temperature can be suppressed by performing a control factor other than the temperature of the smoothing capacitor itself. In the motor control, the motor rotation speed is a value which is normally detected, and an additional detection component may be not necessary.

In addition, in a case where the motor rotation speed is large, the current quickly changes. Therefore, even when a system detects the current in a short current detection period and requires to control the motor with a high accuracy, the current change is delayed in a case where the motor rotation speed is low, so that the current detection period may be shortened. In such a system, even when the intermittent control is performed in a period when the motor rotation speed Rm affecting on the temperature rise of the smoothing capacitor is smaller than the lower limit Rmin, the keeping of the motor control performance and the suppressing of the temperature rise of the smoothing capacitor can be realized.

Furthermore, by applying the determination result of the temperature detection value of the smoothing capacitor together with the scheme of this embodiment, the control of the smoothing capacitor temperature can be realized using two parameters, and the reliability of the power conversion device can be improved and the operation range of the motor control with a high accuracy can be more widened.

Fourth Embodiment

Subsequently, the power conversion device 100 according to a fourth embodiment will be described. While the effective value of the ripple current of the smoothing capacitor is estimated using the motor rotation speed as a parameter in FIG. 8 illustrating the third embodiment, a PWM modulation rate is used as a parameter in this embodiment.

Figure 10:
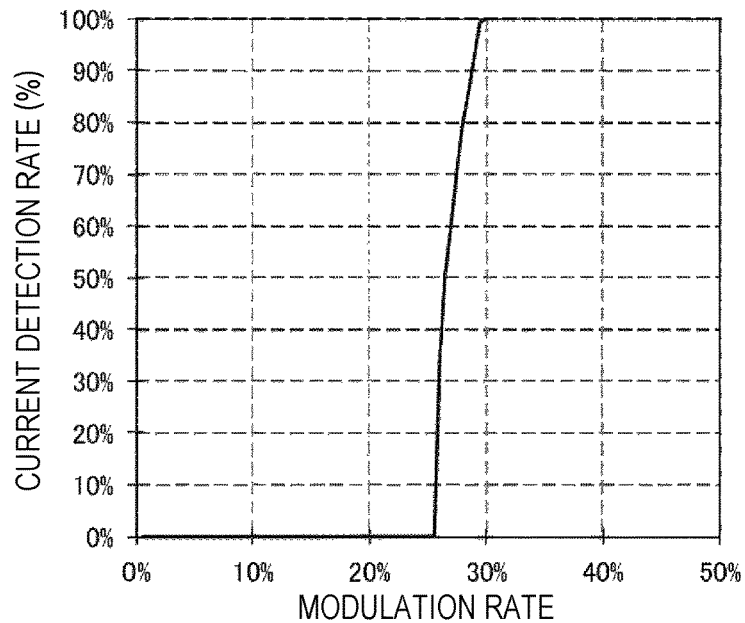
FIG. 10 is a diagram illustrating an estimation result of a current detection rate using a modulation rate as a parameter.

FIG. 10 is a graph illustrating a current detection rate of the power conversion device in which the PWM modulation rate is used as a parameter. The result of FIG. 10 shows that a current detectable rate even when the harmonic wave superposition system does not apply is estimated using the PWM modulation rate as a parameter in a case where one current detector provided in the DC bus bar is used. As can be clearly seen from FIG. 10, the current detection rate largely changes with respect to a certain modulation rate.

The voltage command calculation unit 252 according to this embodiment sets a reference value of the modulation rate, and compares the reference value with the PWM modulation rate calculated from the current command value. The voltage command calculation unit 252 changes the start or stop of the intermittent period of the harmonic wave superposition system, or a magnitude of the period according to the comparison result.

With the control as described above, the control parameter of the control for suppressing the temperature rise of the smoothing capacitor is increased, and controllability is improved. Further, while being equivalent to the modulation rate, a reference value of the motor current is set to the voltage command calculation unit, and then the period of the intermittent control may be changed on the basis of the magnitude of the motor current.

Fifth Embodiment

Figure 11:
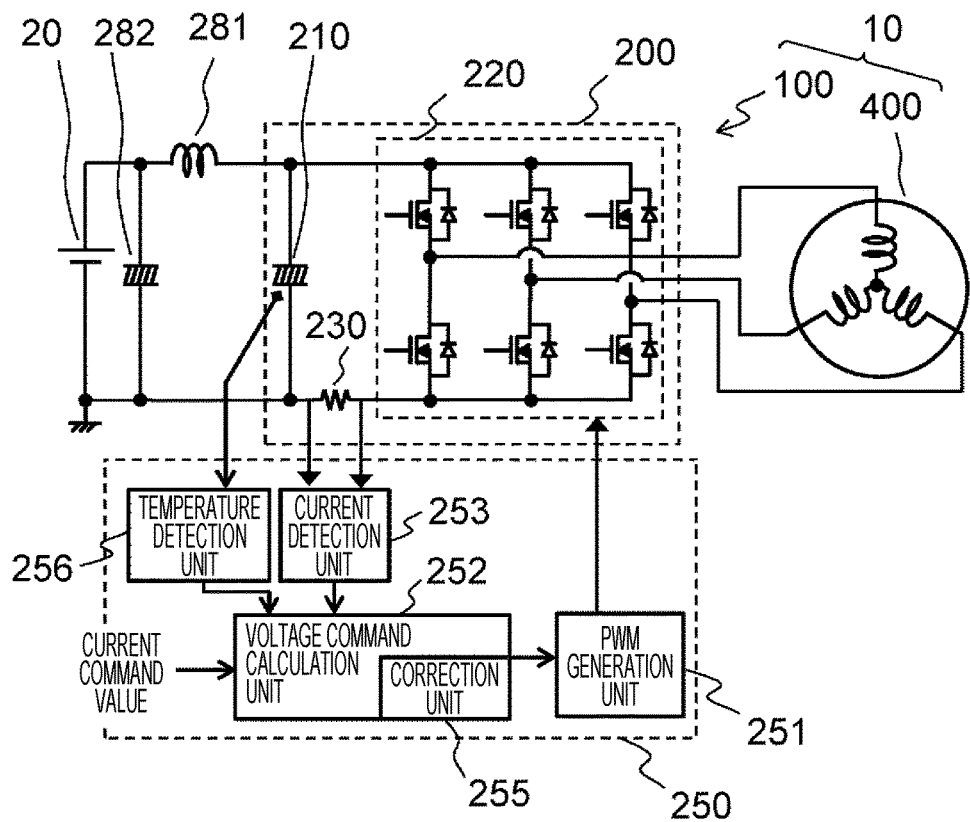
FIG. 11 is a circuit diagram of the power conversion device in a fifth embodiment.

FIG. 11 is a circuit diagram of the power conversion device 100 according to a fifth embodiment. This embodiment shows the drive apparatus 10 which includes the power conversion device 100 made of one power conversion unit 200 and the control unit 250, and one motor 400. Further, the symbol of the power conversion device is the same as that of the power conversion unit 200 of the above embodiments, and the same configurations as those of the above embodiments will be omitted.

The power conversion device 100 includes the temperature detection unit 256 which detects a temperature of the smoothing capacitor 210. In addition, the voltage command calculation unit 252 includes a temperature upper limit Tmax of the smoothing capacitor 210.

The power conversion device 100 applies the harmonic wave superposition system to every carrier period of the PWM waveform for a countermeasure of the noises when the temperature of the smoothing capacitor 210 is smaller than the upper limit Tmax. In a case where the temperature of the smoothing capacitor 210 becomes equal to or more than the upper limit Tmax, the harmonic wave superposition system is intermittently performed as described in the above embodiments. In addition, in a case where the temperature of the smoothing capacitor 210 becomes equal to or more than the upper limit Tmax as described in Case 2 in the second embodiment, the period of the harmonic wave superposition system is controlled to be large.

With the configuration as described above, the noise problem does not occur in a normal time even when the system has a small carrier frequency. In addition, when the smoothing capacitor temperature approaches the upper limit, the harmonic wave superposition system is controlled to be intermittently performed, so that the reliability of the power conversion device is improved.

Furthermore, as described in the fourth embodiment, the timing of the intermittent control of the harmonic wave superposition system may be changed by starting or stopping the control of intermittently performing the harmonic wave superposition system, or by selecting the motor rotation speed, the motor current, or the modulation rate as a parameter to change the length of the period of the intermittent control and setting the reference value to each parameter. Even in such a case, the same effect can be obtained.

Sixth Embodiment

Figure 12:
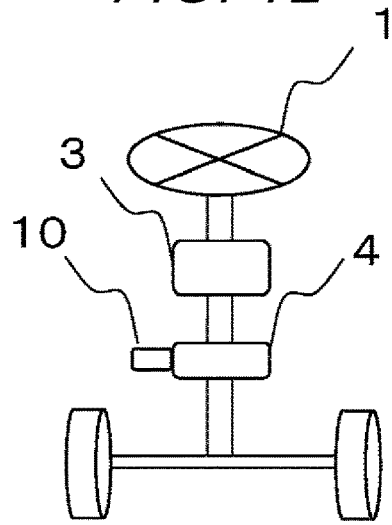
FIG. 12 is a diagram for describing an embodiment of an electric power steering device.

FIG. 12 is a sixth embodiment in which the power conversion device according to the above embodiment is applied to an electric power steering device. As illustrated in FIG. 12, the drive apparatus 10 generates torque through a gear 4 attached to a rotation shaft of a steering 1 of a vehicle, and assists steering according to the steering 1. Herein, the drive apparatus 10 employs the control technique described above.

As described above, the electric power steering device of this embodiment includes a minimized power conversion device, so that it can be applied to a vehicle having a small mounting space, and various vehicle types can be developed. In addition, the electric power steering device of this embodiment includes a noise-reduced power conversion device, so that the drive apparatus may be provided near a driver. In addition, the electric power steering device of this embodiment suppresses the temperature rise of the smoothing capacitor in the power conversion device, so that a system having a high reliability can be realized.

Further, while the above embodiment has been described about that the motor has the three-phase configuration, the invention may achieve the same effect even in a system in which three or more motor windings are provided in the same motor housing.

Furthermore, while the power conversion device has been described to have two power conversion units, the same effect as that of the embodiment described above can be obtained by performing the intermittent control of the power conversion units other than a reference power conversion unit even in a case where there are a plurality of power conversion units.

REFERENCE SIGNS LIST

10 DC power source
100 power conversion device
200 power conversion unit
210 smoothing capacitor
220 three-phase bridge circuit
230 current detector
250 control unit
252 voltage command calculation unit
253 current detection unit
255 correction unit
256 temperature detection unit
257 position detection device
300 power conversion unit
310 smoothing capacitor
320 three-phase bridge circuit 330 current detector
353 current detection unit
356 temperature detection unit
400 motor

The invention claimed is:

1. A power conversion device that converts a DC voltage input from a DC power source into an AC voltage to control a motor, the power conversion device comprising:
a smoothing capacitor that smooths the DC voltage;
a first power conversion unit that includes a bridge circuit to convert power;
a second power conversion unit that includes a bridge circuit to convert power and is connected to the first power conversion unit in parallel;
a control unit that generates a PWM pulse based on an output voltage vector and a PWM carrier; and
a temperature detection unit that detects a temperature of the smoothing capacitor,
wherein the control unit determines whether the temperature is less than a predetermined threshold, generates a first PWM pulse to control an output of the first power conversion unit based on a first output voltage vector, and generates a second PWM pulse to control an output of the second power conversion unit based on a second output voltage vector,
wherein the control unit includes a correction unit that corrects a predetermined output voltage vector value to be two or more different output voltage vector values such that an average value in one period of the PWM carrier becomes the predetermined output voltage vector value,
wherein the correction unit performs a correction of the first output voltage vector value in a first period that is one of a plurality of periods of the PWM carrier, and performs a correction of the second output voltage vector value in a second period that is one of the plurality of periods of the PWM carrier and different from the first period,
wherein the correction unit performs the correction of the first output voltage vector value in the first period, and performs the correction of the second output voltage vector value in the second period based on a determination that the temperature of the smoothing capacitor is not less than the predetermined temperature,
wherein the correction unit performs the correction of the first and second output voltage vector values in 2 or more periods of the PWM carrier based on a determination that the temperature of the smoothing capacitor is less than the predetermined temperature, and
wherein the correction unit further performs the correction of the first and second output voltage vector values in 3 or more periods of the PWM carrier based on the determination that the temperature of the smoothing capacitor is not less than the predetermined temperature.

2. The power conversion device according to claim 1,
wherein the first power conversion unit and the second power conversion unit each include a current detector that detects a DC bus bar current flowing to the bridge circuit and outputs a detected current value to the control unit,
wherein the current detector of the first power conversion unit detects the DC bus bar current in the first period, and
wherein the current detector of the second power conversion unit detects the DC bus bar current in the second period.

3. The power conversion device according to claim 1,
wherein the correction unit performs the correction in every period of the PWM carrier when the temperature of the smoothing capacitor is smaller than the predetermined temperature.

4. The power conversion device according to claim 1, comprising
a rotation speed detection unit that detects a rotation speed of a rotor provided in the motor,
wherein, when the rotation speed of the rotor is equal to or less than a predetermined rotation speed, the correction unit performs the correction of the first output voltage vector value in the first period, and performs the correction of the second output voltage vector value in the second period.

5. The power conversion device according to claim 4,
wherein the correction unit performs the correction in every period of the PWM carrier when the rotation speed of the rotor is larger than the predetermined rotation speed.

6. The power conversion device according to claim 4,
wherein the correction unit performs the correction in N3 periods of the PWM carrier when the rotation speed of the rotor is larger than the predetermined rotation speed, wherein N3 is a natural number of "2" or more, and
wherein the correction unit further performs the correction in N4 periods of the PWM carrier when the rotation speed of the rotor is equal to or less than the predetermined rotation speed, wherein N4 is a natural number larger than N3.

7. The power conversion device according to claim 6,
wherein, when a modulation rate of the first or second PWM pulse is equal to or less than a predetermined modulation rate, the correction unit performs the correction of the first output voltage vector value in the first period, and performs the correction of the second output voltage vector value in the second period.

8. The power conversion device according to claim 1,
wherein the smoothing capacitor includes a first smoothing capacitor provided in the first power conversion unit and a second smoothing capacitor provided in the second power conversion unit,
wherein the first power conversion unit includes a first temperature detection unit that detects a temperature of the first smoothing capacitor,
wherein the second power conversion unit includes a second temperature detection unit that detects a temperature of the second smoothing capacitor, and
wherein the correction unit performs the correction of the first output voltage vector value in the first period in a case where the temperature of the first smoothing capacitor is equal to or more than a predetermined temperature.

9. An electric power steering device, comprising:
the power conversion device according to claim 1; and
the motor that is controlled by the power conversion device.

10. A power conversion device that converts a DC voltage input from a DC power source into an AC voltage to control a motor, the power conversion device comprising:
a smoothing capacitor that smooths the DC voltage;
a first power conversion unit that includes a bridge circuit to convert power;
a second power conversion unit that includes a bridge circuit to convert power and is connected to the first power conversion unit in parallel; and a control unit that generates a PWM pulse based on an output voltage vector and a PWM carrier, wherein the control unit generates a first PWM pulse to control an output of the first power conversion unit based on a first output voltage vector, and generates a second PWM pulse to control an output of the second power conversion unit based on a second output voltage vector, wherein the control unit includes a correction unit that corrects a predetermined output voltage vector value to be two or more different output voltage vector values such that an average value in one period of the PWM carrier becomes the predetermined output voltage vector value, and wherein the correction unit performs the correction of the first output voltage vector value by harmonic wave superposition only in a first period that is one of a plurality of periods of the PWM carrier, and performs the correction of the second output voltage vector value by harmonic wave superposition only in a second period that is one of the plurality of periods of the PWM carrier and different from the first period.

* * * * *